United States Patent
Tsao et al.

(10) Patent No.: US 8,179,654 B2
(45) Date of Patent: May 15, 2012

(54) SURGE PREVENTING CIRCUIT, LOCAL AREA NETWORK CONNECTOR, AND NETWORK MODULE

(75) Inventors: Wei-Chun Tsao, Taipei (TW); Yu-Hsiang Li, Taipei (TW)

(73) Assignee: Unihan Corporation, Beitou District, Taipei (TW)

( * ) Notice: Subject to any disclaimer, the term of this patent is extended or adjusted under 35 U.S.C. 154(b) by 420 days.

(21) Appl. No.: 12/634,666

(22) Filed: Dec. 9, 2009

(65) Prior Publication Data

US 2010/0142106 A1 Jun. 10, 2010

(30) Foreign Application Priority Data

Dec. 10, 2008 (TW) ................................ 97148081 A

(51) Int. Cl.
*H02H 3/22* (2006.01)
(52) U.S. Cl. .............. 361/111; 361/35; 361/38; 361/40; 361/56
(58) Field of Classification Search .................... 361/18, 361/35, 56, 111
See application file for complete search history.

(56) References Cited

U.S. PATENT DOCUMENTS

| | | | | |
|---|---|---|---|---|
| 5,796,781 A | * | 8/1998 | DeAndrea et al. | ............ 375/288 |
| 5,995,353 A | * | 11/1999 | Cunningham et al. | ........ 361/111 |
| 7,502,213 B2 | * | 3/2009 | Matsuoka et al. | ............ 361/117 |
| 7,701,092 B1 | * | 4/2010 | Parker et al. | ................... 307/154 |
| 2004/0239465 A1 | * | 12/2004 | Chen et al. | .................... 336/173 |
| 2008/0192401 A1 | | 8/2008 | Terada | |

FOREIGN PATENT DOCUMENTS

| | | |
|---|---|---|
| CN | 1549416 A | 11/2004 |
| CN | 1658464 A | 8/2005 |
| CN | 201097449 | 8/2008 |
| CN | 201146383 Y | 11/2008 |
| JP | H1126185 A | 1/1999 |
| JP | H1168497 A | 3/1999 |
| JP | 2007529189 A | 10/2007 |
| KR | 100802350 B1 | 2/2008 |
| KR | 1020080015354 A | 2/2008 |
| KR | 1020080080905 A | 9/2008 |
| WO | 2005088799 | 9/2005 |

* cited by examiner

*Primary Examiner* — Rexford Barnie
*Assistant Examiner* — Tien Mai
(74) *Attorney, Agent, or Firm* — Winston Hsu; Scott Margo

(57) ABSTRACT

A surge preventing circuit of a local area network (LAN) connector is suitable for being coupled to a plurality of transformers disposed in the local area network connector. The surge preventing circuit includes a conjugate coil module and a surge absorbing element. The conjugate coil module has at least one conjugate coil. The conjugate coil has a first input terminal, a second input terminal, a first output terminal, and a second output terminal. The first input terminal and the second input terminal of the conjugate coil are coupled to the center tapped terminal of the respective transformer, respectively. A first terminal of the surge absorbing element is connected to ground, and a second terminal is coupled to the first output terminals and the second output terminals.

20 Claims, 4 Drawing Sheets

SURGE PREVENTING CIRCUIT, LOCAL AREA NETWORK CONNECTOR, AND NETWORK MODULE

CROSS-REFERENCE TO RELATED APPLICATIONS

This Non-provisional application claims priority under 35 U.S.C. §119(a) on Patent Application No(s). 097148081 filed in Taiwan, Republic of China Dec. 10, 2008, the entire contents of which are hereby incorporated by reference.

BACKGROUND OF THE INVENTION

1. Field of the Invention

The invention relates to a surge preventing circuit and, more particularly, to a surge preventing circuit, a local area network (LAN) connector using the same, and a network module using the same.

2. Description of the Related Art

A generation of a surge will affect a product, such as a computer or a mobile phone and so on, through a power transmission circuit or a ground route, and the affection of the surge may vary with an inrush route or inrush energy. When the surge directly rushes into the interior of the product, the damage to the product is the greatest. A great surge is generated from lightning strike, and a lightning rod is used for actively guiding the energy of the lightning strike in discharging. Electric current generated from the lightning strike may cause a sudden rise of the voltage at a ground resistor, and the electric current may be transmitted to the product through a coupling circuit embedded in the ground, result in damage of the inner elements of the product or failure of certain functions of the product. Therefore, a surge preventing device is a necessary device in a circuit.

According to a conventional surge preventing device, a transformer is disposed in a product circuit, and the transformer is used for reducing high voltage. The other method, a surge absorbing element such as a Zener diode or a metal oxide varistor (MOV) is used. A Zener diode is taken for example. Under a normal circuit voltage, the surge absorbing element does not work. When a surge is generated to cause a sudden rise of the voltage, since the external voltage of the surge absorbing element exceeds a breakdown voltage thereof to form a conductive circuit, at that moment, part of the current generated by a sudden rise of the voltage may be absorbed by the surge absorbing element, and the other part may be transmitted to a ground terminal through the surge absorbing element. Thus, a back-end circuit can be prevented from being damaged by the high current.

FIG. 1 is a circuit diagram showing a local area network (LAN) module having a surge preventing circuit in the prior art. Please refer to FIG. 1. A conventional local area network module 100 has a local area network connector 102 and a surge preventing circuit 104. The surge preventing circuit 104 includes three surge absorbing elements 104a, 104b, 104c and two resistors $R_1$, $R_2$. One side of the local area network connector 102 has a transmitting terminal TX, a center tapped transmitting terminal TXCT, a receiving terminal RX, and a center tapped receiving terminal RXCT. The transmitting terminal TX and the receiving terminal RX are coupled to a network (not shown), respectively. The center tapped transmitting terminal TXCT is coupled to a second terminal 2 of the surge absorbing element 104b, a first terminal 1 of the resistor $R_2$, and a first terminal 1 of the surge absorbing element 104c. The center tapped receiving terminal RXCT is coupled to a first terminal 1 of the surge absorbing element 104a, a first terminal 1 of the resistor $R_1$, and a first terminal 1 of the surge absorbing element 104b. In addition, the second terminals 2 of the resistors $R_1$, $R_2$ and the surge absorbing elements 104a, 104c are coupled to ground. The resistors $R_1$, $R_2$ can be coupled to ground though a capacitor C1.

In FIG. 1, when a surge is generated, the voltage suddenly rises to cause a sudden rise of current in an element. When the suddenly risen current flowing through the center tapped receiving terminal RXCT flows to a node A, part of the current may be absorbed by the surge absorbing element 104b or may flow to the ground terminal through the surge absorbing element 104a. In the same way, when the suddenly risen current flowing through the center tapped transmitting terminal TXCT flows to a node B, part of the current may also be absorbed by the surge absorbing element 104b or may flow to the ground terminal through the surge absorbing element 104c. Through the surge absorbing elements 104a, 104b, 104c, the current generated by the sudden rise of the voltage can be guided to the ground, thereby being capable of preventing the back-end circuit from being damaged by the high current.

However, although the surge absorbing element is used for protecting the circuit, the cost is high, and the number of the surge absorbing element increases with the number of the transformer.

BRIEF SUMMARY OF THE INVENTION

One objective of this invention is to provide a surge preventing circuit. In the invention, a single surge absorbing element is used thus to effectively prevent a surge from damaging a circuit element.

The embodiment of invention provides a local area network (LAN) connector including the surge preventing circuit.

The embodiment of invention provides a network module including the local area network connector.

The embodiment of invention provides a surge preventing circuit of a local area network connector, and the surge preventing circuit is coupled to a plurality of transformers disposed in the local area network connector. The surge preventing circuit includes a conjugate coil module and a surge absorbing element. The conjugate coil module has at least one conjugate coil. The conjugate coil has a first input terminal, a second input terminal, a first output terminal, and a second output terminal. The first input terminal and the second input terminal of the conjugate coil are coupled to the center tapped terminal of the respective transformer, respectively. The surge absorbing element has a first terminal and a second terminal. The first terminal of the surge absorbing element is connected to ground, and the second terminal is coupled to the first output terminals and the second output terminals.

In one embodiment of the invention, the surge absorbing element may include a ceramic gas tube, a transient voltage suppressor (TVS) diode, a spark gap, or a metal oxide varistor (MOV) surge absorber.

The embodiment of invention provides a local area network connector including a plurality of transformers, a conjugate coil module, and a surge absorbing element. A secondary side of each of the transformers includes a first terminal point, a second terminal point, and a center tapped terminal. The conjugate coil module has at least one first conjugate coil, and the first conjugate coil has a first input terminal and a second input terminal for being coupled to the center tapped terminal of the respective transformer, respectively. The first conjugate coil further has a first output terminal and a second output terminal. The surge absorbing element has a first terminal and a second terminal. The first terminal of the surge absorbing element is connected to ground, and the second terminal is coupled to the first output terminal and the second output terminal of the first conjugate coil.

In one embodiment of the invention, the local area network connector may further include a plurality of resistors. First terminals of the resistors may be connected to the ground, and second terminals of the resistors may be correspondingly coupled to the center tapped terminal of the respective transformer, respectively. The first terminals of the resistors may be connected to the ground through a capacitor.

In one embodiment of the invention, the surge absorbing element may include a ceramic gas tube, a transient voltage suppressor diode, a spark gap, or a metal oxide varistor surge absorber.

In one embodiment of the invention, the first terminal point and the second terminal point of a part of the secondary sides of the transformers may be used as a data transferring terminal group of the local area network connector.

In one embodiment of the invention, the first terminal point and the second terminal point of a part of the secondary sides of the transformers may be used as a data receiving terminal group of the local area network connector.

In another aspect, the embodiment of invention provides a network module including a processing unit, a network connector, and a surge absorbing element. The processing unit is used for controlling transfer or reception of data. The network connector is coupled to the network and the processing unit to receive or transfer the data. The network connector includes a plurality of transformers, a conjugate coil module, and a surge absorbing element. A secondary side of each of the transformers includes a first terminal point, a second terminal point, and a center tapped terminal. The conjugate coil module has at least one first conjugate coil, and the first conjugate coil has a first input terminal and a second input terminal for being coupled to the center tapped terminal of the respective transformer, respectively. The first conjugate coil further has a first output terminal and a second output terminal. The surge absorbing element has a first terminal and a second terminal. The first terminal of the surge absorbing element is connected to ground, and the second terminal is coupled to the first output terminal and the second output terminal of the first conjugate coil.

In one embodiment of the invention, the local area network connector may further include a plurality of resistors. First terminals of the resistors may be connected to the ground, and second terminals of the resistors may be correspondingly coupled to the center tapped terminal of the respective transformer, respectively. The first terminals of the resistors may be connected to the ground through a capacitor.

In one embodiment of the invention, the surge absorbing element may include a ceramic gas tube, a transient voltage suppressor diode, a spark gap, or a metal oxide varistor surge absorber.

In one embodiment of the invention, the first terminal point and the second terminal point of a part of the secondary sides of the transformers may be used as a data transferring terminal group of the local area network connector.

In one embodiment of the invention, the first terminal point and the second terminal point of a part of the secondary sides of the transformers may be used as a data receiving terminal group of the local area network connector.

In one embodiment of the invention, the network module may further include a plurality of second conjugate coils. Each of the second conjugate coils may have a first input terminal and a second input terminal for being correspondingly coupled to the first terminal point and the second terminal point of the secondary side of one of the transformers.

Each of the second conjugate coils may have a first output terminal and a second output terminal for being coupled to a network.

In one embodiment of the invention, the number of the first conjugate coil of the conjugate coil module may be determined by the number of the transformers.

In one embodiment of the invention, the number of the transformers may be two times of the number of the first conjugate coil of the conjugate coil module.

According to the surge preventing circuit in the invention, each of the center tapped terminals of the transformers is correspondingly coupled to a first conjugate coil of the conjugate coil module, and output terminals of the first conjugate coil are electrically connected with each other and are coupled to a surge absorbing element for ground. Thus, when high current is generated at any center tapped terminal, part of the current can be guided to a ground terminal through the single surge absorbing element, thereby protecting the circuit. Further, since the surge preventing circuit in this invention just has a single surge absorbing element to protect the circuit, the cost of the circuit element is reduced. In addition, the similar technique can be applied to a local area network connector and a network module.

These and other features, aspects, and advantages of the present invention will become better understood with regard to the following description, appended claims, and accompanying drawings.

DETAILED DESCRIPTION OF THE INVENTION

Embodiments of this invention are described in detail hereinbelow according to drawings. In addition, in the following embodiments and drawings, the same or similar reference numbers are used to mark the same or similar elements to simplify the description.

Figure 1:
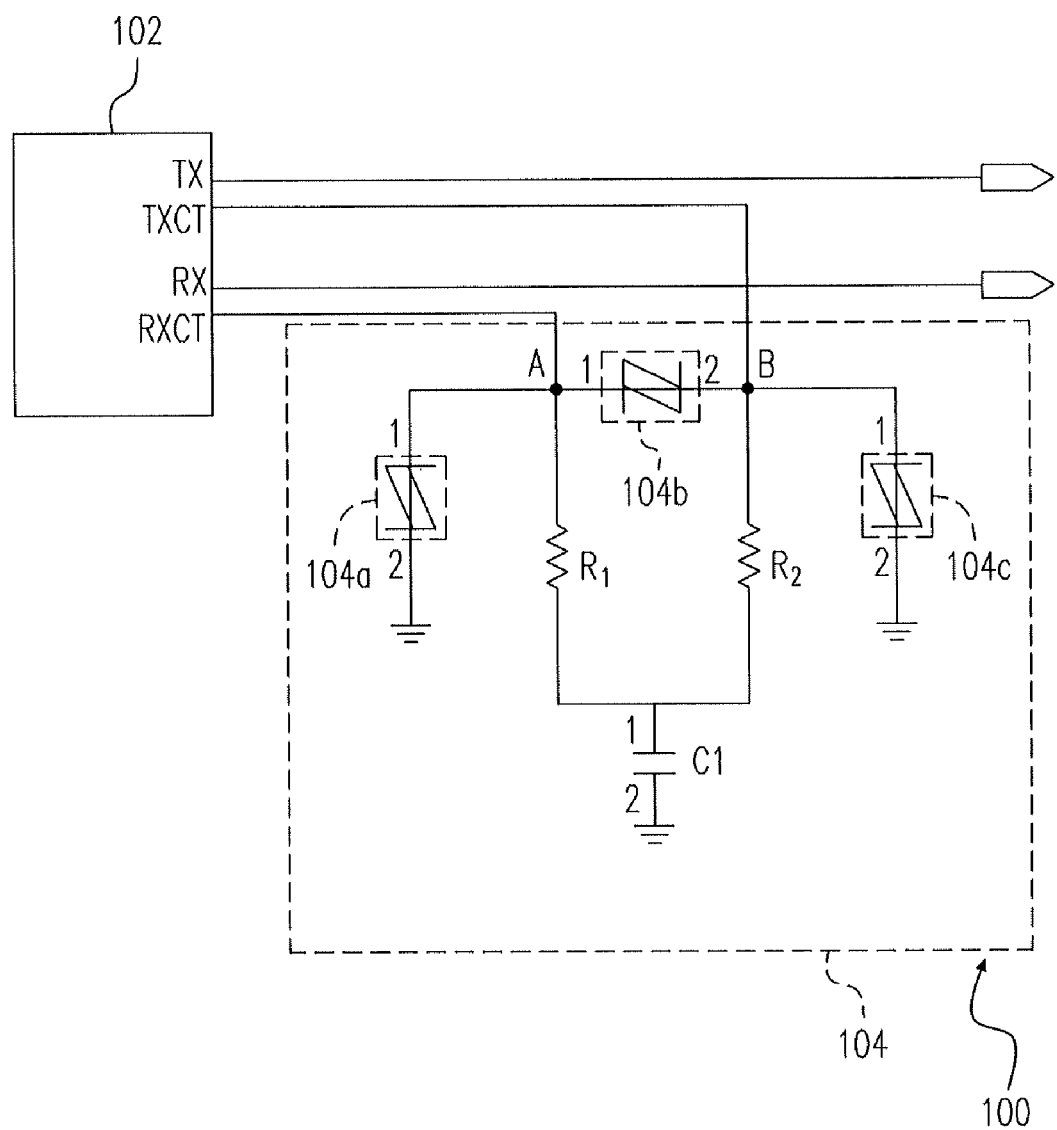
FIG. 1 is a circuit diagram showing a local area network (LAN) module having a surge preventing circuit in the prior art.
Figure 2:
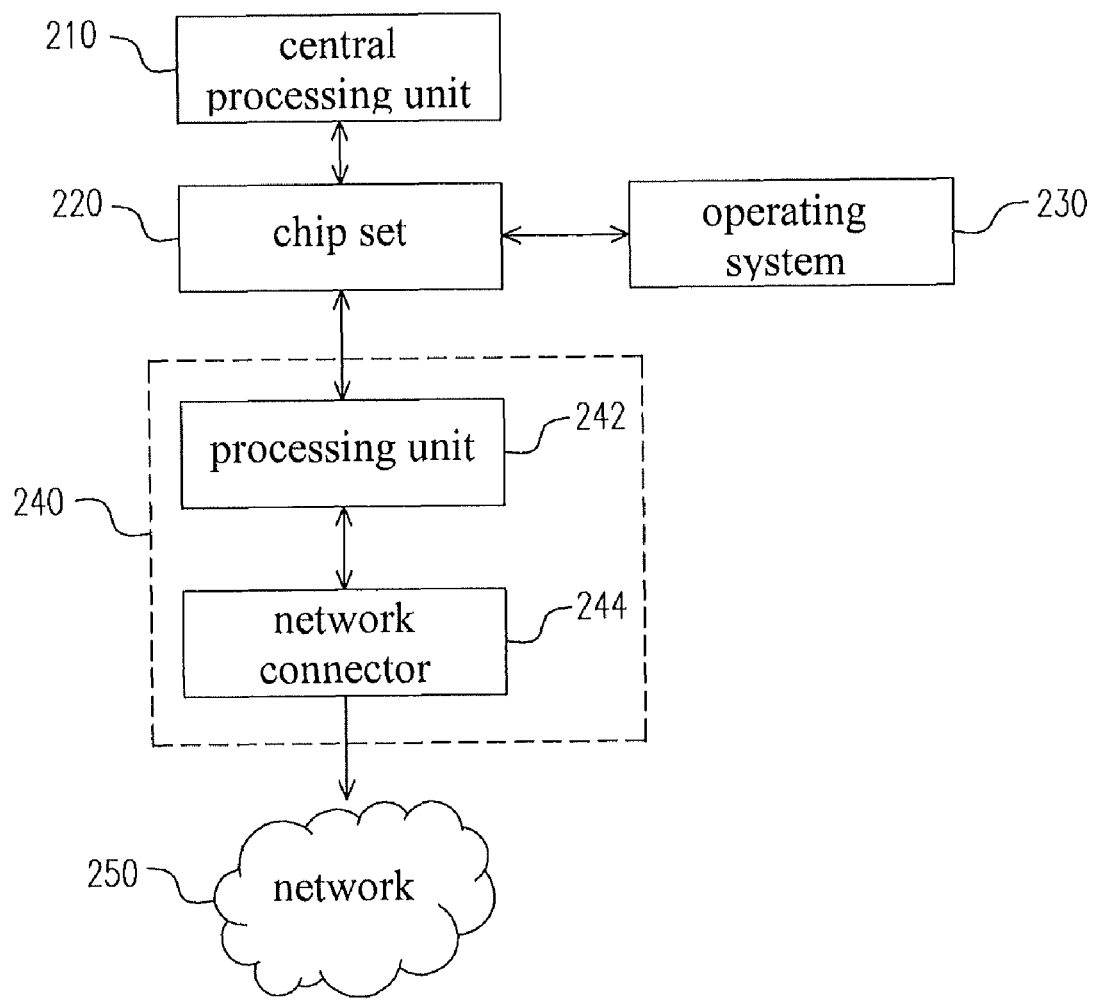
FIG. 2 is a block diagram showing a computer system according to one embodiment of the invention.

FIG. 2 is a block diagram showing a computer system according to one embodiment of the invention. Please refer to FIG. 2. A computer system includes a central processing unit (CPU) 210, a chip set 220, an operating system (OS) 230, a network module 240, and a network 250. The network module 240 further includes a processing unit 242 and a network connector 244.

The central processing unit 210 generally includes an arithmetic logic unit, a control unit, and a storage unit. The chip set 220 is a control center of the whole computer system and is used for connecting the running of the central processing unit 210 and other peripheral devices (such as the operating system 230 or the processing unit 242). The operating system 230 is a program for managing a computer hardware and software resource, and it can be used for managing and disposing memories, determining priority of a system resource supply, controlling input and output devices, operating a network, and managing a file system and so on. Further, the operating system 230 can also provide an operation interface for a user to interact with the system.

The processing unit 242 of the network module 240 is used for controlling transfer or reception of data, and it is coupled to the network connector 244. Thus, the network connector 244 can transfer the data received from the processing unit 242 to the network 250.

The network module is described in detail hereinbelow according to the embodiment of the invention with the drawings.

Figure 3:
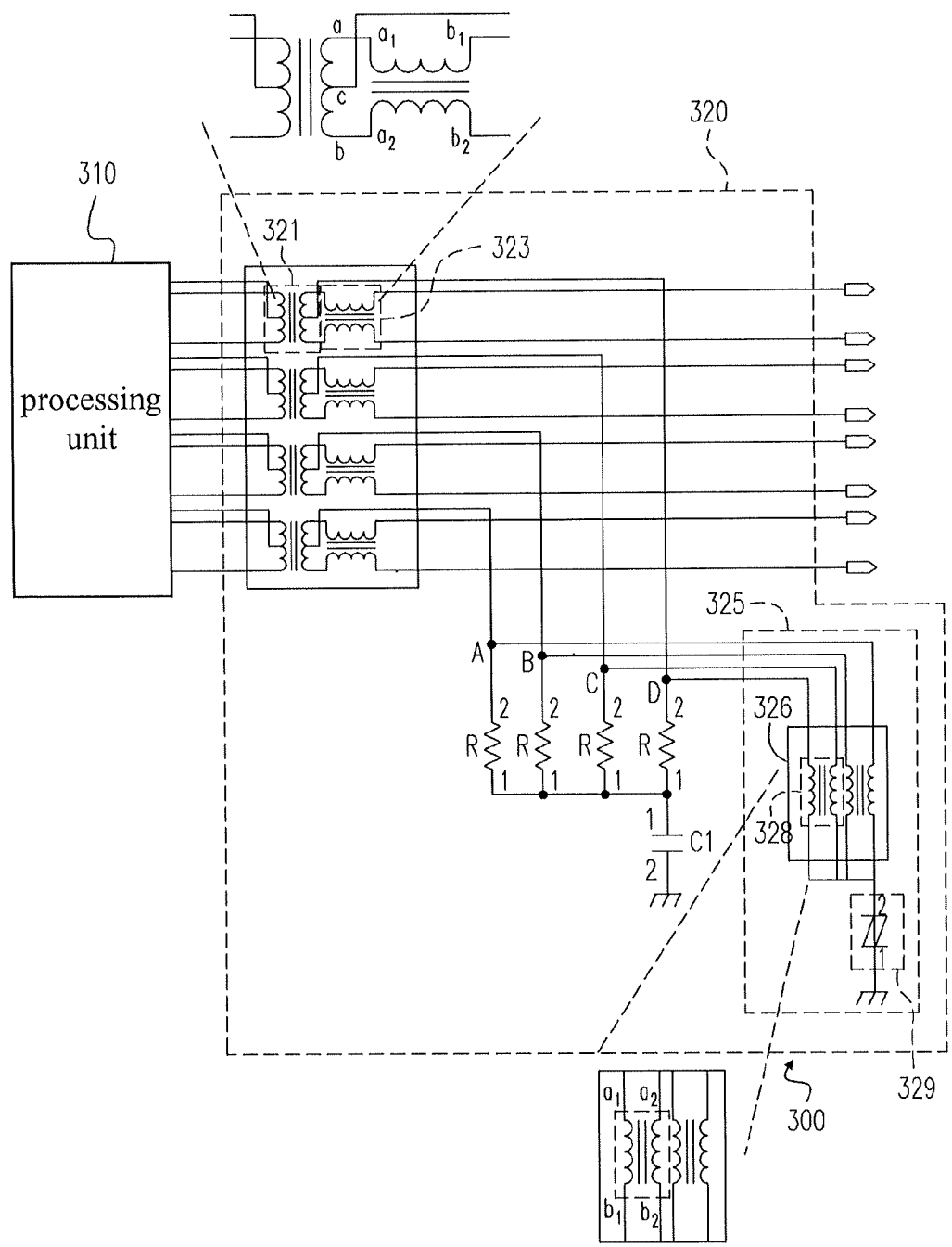
FIG. 3 is a circuit diagram showing a network module according to one embodiment of the invention.

FIG. 3 is a circuit diagram showing a network module according to one embodiment of the invention. In FIG. 3, a network module 300 includes a processing unit 310 and a network connector 320. The network connector 320 has a plurality of transformers 321, a plurality of second conjugate coils 323 (only four transformers and four second conjugate coils are shown in FIG. 3), and a surge preventing circuit 325. The network connector 320 may be a local area network (LAN) connector. In addition, in this embodiment, the network module 300 can further include a plurality of resistors R (only four resistors are shown in FIG. 3). Each of the resistors R has a first terminal 1 and a second terminal 2. The first terminals 1 of the resistors R are connected to ground, and the second terminals 2 are coupled to the transformers 321 and the surge preventing circuit 325. The first terminals 1 of the resistors R are connected to the ground through a capacitor C1.

A secondary side of each of the transformers 321 includes a first terminal point a, a second terminal point b, and a center tapped terminal c. Each of the center tapped terminals c is correspondingly coupled to the second terminal 2 of the respective resistor R, and the first terminal point a and the second terminal point b of a part of the secondary sides can be used as a data transferring terminal group or a data receiving terminal group of the local area network connector. Each of the second conjugate coils 323 has a first input terminal $a_1$, a second input terminal $a_2$, a first output terminal $b_1$, and a second output terminal $b_2$. The first input terminal $a_1$ and the second input terminal $a_2$ of each of the second conjugate coils 323 are correspondingly coupled to the first terminal point a and the second terminal point b of the secondary side of the respective transformer 321, and the first output terminal $b_1$ and the second output terminal $b_2$ are coupled to a network (such as the network 250 in FIG. 2), respectively.

The surge preventing circuit 325 includes a conjugate coil module 326 and a surge absorbing element 329. The surge absorbing element 329 has a first terminal 1 and a second terminal 2, and the first terminal 1 is coupled to the ground. In addition, the surge absorbing element 329 may be a ceramic gas tube, a transient voltage suppressor (TVS) diode, a spark gap, or a metal oxide varistor (MOV) surge absorber. The conjugate coil module 326 at least has a first conjugate coil 328 (only two first conjugate coils are shown in FIG. 3), and the first conjugate coil 328 has a first input terminal $a_1$, a second input terminal $a_2$, a first output terminal $b_1$, and a second output terminal $b_2$. The first input terminal $a_1$ and the second input terminal $a_2$ are correspondingly coupled to the center tapped terminal c of the secondary side of the respective transformer 321, and they are correspondingly coupled to the second terminal 2 of the respective resistor R at the same time. All of the first output terminal $b_1$ and the second output terminal $b_2$ are electrically connected with each other and are coupled to the second terminal 2 of the surge absorbing element 329.

In addition, the number of the first conjugate coil 328 is determined by the number of the transformer 321. For example, if the number of the transformer 321 decreases to two, only one first conjugate coil 328 is needed. If the number of the transformer 321 increases to six, the number of the first conjugate coil 328 increases to three. That is, the center tapped terminals c of every two transformers 321 can be correspondingly coupled to the first input terminal $a_1$ and the second input terminal $a_2$ of the first conjugate coil 328, respectively.

The circuit design of the network module 300 is described according to the above. The operation details are further described hereinbelow according to the embodiment.

According to FIG. 3, when a surge is generated to cause a sudden rise of the voltage (for example, a lightning strike is suffered), current in an element suddenly rises. When the high current generated by any one of the transformers 321 at the center tapped terminal c flows through nodes A, B, C, or D according to the circuit connection mode, part of the current may be transmitted to ground through the resistors R, and part of the current may shunt to the first conjugate coil 328 and be guided by the surge absorbing element 329 to the ground terminal. Therefore, the surge preventing circuit 325 including the surge absorbing element 329 can buffer or consume the sudden risen energy and guide the other energy to the ground terminal, thereby greatly reducing impact suffered by the original circuit.

Figure 4:
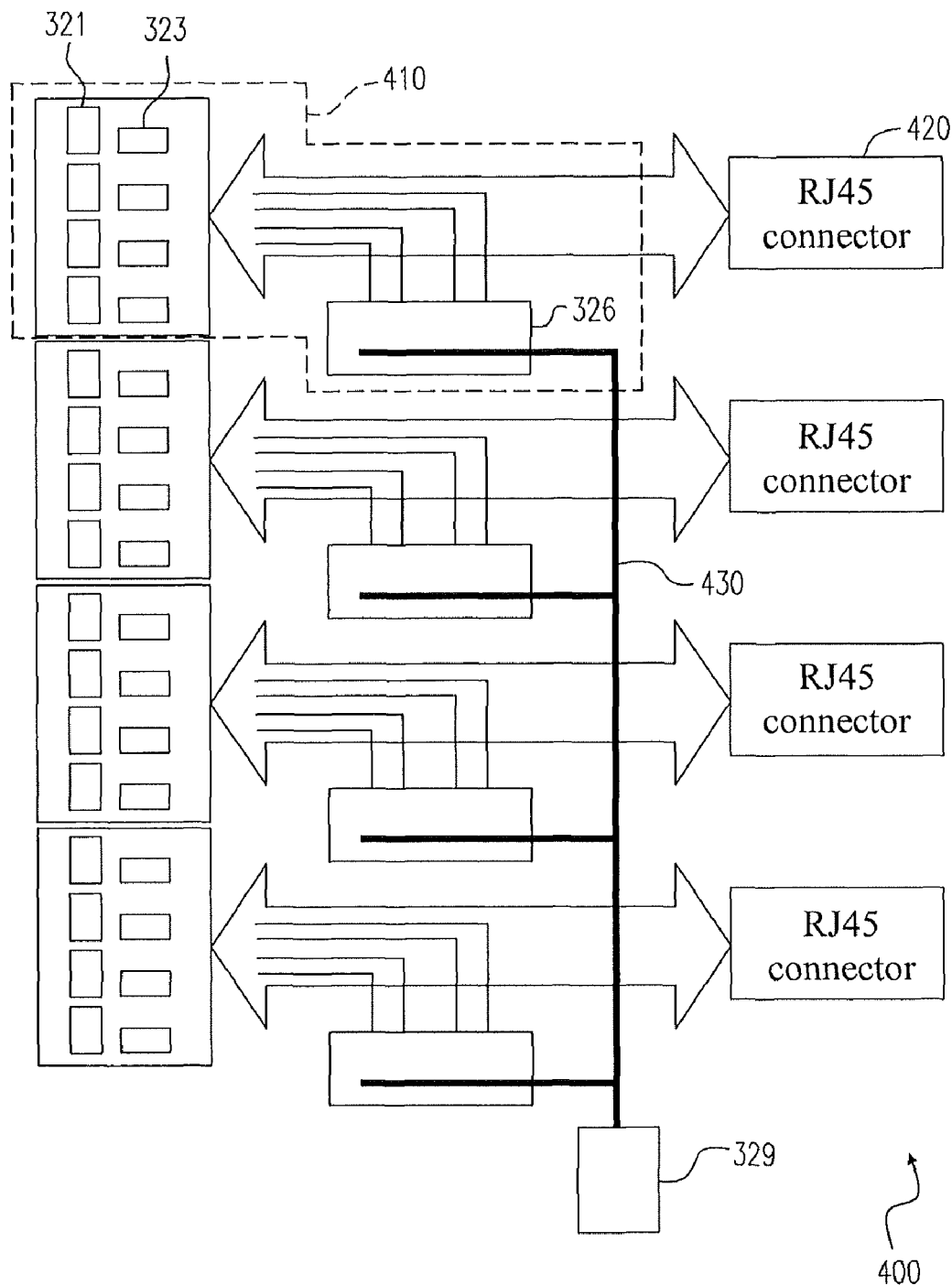
FIG. 4 is a partial circuit diagram showing a network module according to another embodiment of the invention.

The network module 300 can further include a plurality of network connectors 320. FIG. 4 is a partial circuit diagram showing a network module according to another embodiment of the invention. Please refer to FIG. 3 and FIG. 4 together. In this embodiment, a network module 400 includes four network connectors 410, four RJ45 connectors 420, and a surge absorbing element 329. Each of the network connectors 410 includes four transformers 321, four second conjugate coils 323, and a conjugate coil module 326. The conjugate coil module 326 has two first conjugate coils (not shown), and the inner circuit connection of the conjugate coil module 326 is the same as that in FIG. 3. In addition, the conjugate coil modules 326 of the network connectors 410 are electrically connected with each other through a cable 430 and are coupled to the surge absorbing element 329. Thus, if the current of any one of the network connectors 410 suddenly rises, part of the current can flow from the conjugate coil module 326 to the surge absorbing element 329 through the cable 430 thus to be guided to the ground terminal. Therefore, when the number of the network connector 321 increases, the network module 400 in this embodiment of the invention can still use only one surge absorbing element 329 to protect the whole circuit.

To sum up, according to the embodiments of the invention, the conventional surge preventing circuit is redesigned. Each of the transformers is correspondingly coupled to the first conjugate coil of the conjugate coil module, and output terminals of the first conjugate coils are electrically connected with each other and are coupled to ground through a surge absorbing element. Thus, when the current of any one of the transformers suddenly rises, part of the current can be guided to the ground terminal through the surge absorbing element, thereby protecting the circuit. Further, since the surge preventing circuit in the embodiments of the invention uses a single surge absorbing element to protect the circuit, the cost of the circuit element is reduced. In addition, the surge preventing circuit can further be cooperated with other circuit modules and has certain universality for application.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A surge preventing circuit of a local area network (LAN) connector suitable for being coupled to a plurality of transformers disposed in the local area network connector, the surge preventing circuit comprising:
    a conjugate coil module having at least one conjugate coil, the conjugate coil having a first input terminal, a second input terminal, a first output terminal, and a second output terminal, the first input terminal and the second input terminal of the conjugate coil being coupled to the center tapped terminal of the respective transformer respectively; and
    a surge absorbing element having a first terminal and a second terminal, the first terminal connected to ground, the second terminal coupled to the first output terminals and the second output terminals.

2. The surge preventing circuit according to claim 1, wherein the surge absorbing element comprises a ceramic gas tube, a transient voltage suppressor (TVS) diode, a spark gap, or a metal oxide varistor (MOV) surge absorber.

3. A local area network connector comprising:
    a plurality of transformers, a secondary side of each of the transformers including a first terminal point, a second terminal point, and a center tapped terminal;
    a conjugate coil module having at least one first conjugate coil, the first conjugate coil having a first input terminal and a second input terminal for being coupled to the center tapped terminal of the respective transformer respectively, the first conjugate coil further having a first output terminal and a second output terminal; and
    a surge absorbing element having a first terminal and a second terminal, the first terminal connected to ground, the second terminal coupled to the first output terminal and the second output terminal of the first conjugate coil.

4. The local area network connector according to claim 3, further comprising a plurality of resistors, each of the resistors including a first terminal and a second terminal, the first terminals connected to the ground, the second terminals coupled to the center tapped terminal of the respective transformer, respectively.

5. The local area network connector according to claim 4, wherein the first terminals of the resistors are connected to the ground through at least one capacitor.

6. The local area network connector according to claim 3, wherein the surge absorbing element comprises a ceramic gas tube, a transient voltage suppressor (TVS) diode, a spark gap, or a metal oxide varistor (MOV) surge absorber.

7. The local area network connector according to claim 3, wherein the first terminal point and the second terminal point of a part of the secondary sides of the transformers are used as a data transferring terminal group of the local area network connector.

8. The local area network connector according to claim 3, wherein the first terminal point and the second terminal point of a part of the secondary sides of the transformers are used as a data receiving terminal group of the local area network connector.

9. The local area network connector according to claim 3, further comprising a plurality of second conjugate coils, each of the second conjugate coils having a first input terminal and a second input terminal for being correspondingly coupled to the first terminal point and the second terminal point of the secondary side of one of the transformers, each of the second conjugate coils further having a first output terminal and a second output terminal for being coupled to a network.

10. The local area network connector according to claim 3, wherein the number of the first conjugate coil of the conjugate coil module is determined by the number of the transformers.

11. The local area network connector according to claim 10, wherein the number of the transformers is two times of the number of the first conjugate coil of the conjugate coil module.

12. A network module comprising:
    a processing unit for controlling transfer or reception of data; and
    a network connector suitable for being coupled to a network and the processing unit to receive or transfer the data, the network connector including:
        a plurality of transformers, a secondary side of each of the transformers including a first terminal point, a second terminal point, and a center tapped terminal;
        a conjugate coil module having at least one first conjugate coil, the first conjugate coil having a first input terminal and a second input terminal coupled to the center tapped terminal of the respective transformer, respectively, the first conjugate coil further having a first output terminal and a second output terminal; and
        a surge absorbing element having a first terminal connected to ground and a second terminal coupled to the first output terminal and the second output terminal of the first conjugate coil.

13. The network module according to claim 12, further comprising a plurality of resistors, each of the resistors having a first terminal and a second terminal, the first terminals connected to the ground, the second terminals coupled to the center tapped terminal of the respective transformer, respectively.

14. The network module according to claim 13, wherein the first terminals of the resistors are connected to the ground through at least one capacitor.

15. The network module according to claim 12, wherein the surge absorbing element comprises a ceramic gas tube, a transient voltage suppressor (TVS) diode, a spark gap, or a metal oxide varistor (MOV) surge absorber.

16. The network module according to claim 12, wherein the first terminal point and the second terminal point of a part of the secondary sides of the transformers are used as a data transferring terminal group of the network connector.

17. The network module according to claim 12, wherein the first terminal point and the second terminal point of a part of the secondary sides of the transformers are used as a data receiving terminal group of the network connector.

18. The network module according to claim 12, further comprising a plurality of second conjugate coils, each of the second conjugate coils having a first input terminal and a second input terminal for being correspondingly coupled to the first terminal point and the second terminal point of the secondary side of one of the transformers, each of the second conjugate coils further having a first output terminal and a second output terminal for being coupled to a network.

19. The network module according to claim 12, wherein the number of the first conjugate coil of the conjugate coil module is determined by the number of the transformers.

20. The network module according to claim 12, wherein the number of the transformers is two times of the number of the first conjugate coil of the conjugate coil module.

* * * * *